(12) United States Patent
Sommer et al.

(10) Patent No.: US 9,517,528 B2
(45) Date of Patent: *Dec. 13, 2016

(54) TOOL AND METHOD FOR BONDING LAYERS OF A METALLIC AXISYMMETRIC STRUCTURE HAVING COMPLEX CURVATURES

(71) Applicant: ROHR, INC., Chula Vista, CA (US)

(72) Inventors: Thomas Edward Sommer, San Diego, CA (US); Mark Alan Ramsey, Chula Vista, CA (US); David Dwain Rishel, Smithville, TX (US)

(73) Assignee: ROHR, INC., Chula Vista, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 14/060,305

(22) Filed: Oct. 22, 2013

(65) Prior Publication Data

US 2014/0090773 A1 Apr. 3, 2014

Related U.S. Application Data

(62) Division of application No. 12/029,179, filed on Feb. 11, 2008, now Pat. No. 8,584,726.

(51) Int. Cl.
*B32B 37/10* (2006.01)
*B23K 20/02* (2006.01)
*B32B 37/00* (2006.01)

(52) U.S. Cl.
CPC ......... *B23K 20/023* (2013.01); *B32B 37/0046* (2013.01); *B32B 37/10* (2013.01); *B32B 37/1009* (2013.01); *B23K 2201/02* (2013.01); *B23K 2201/04* (2013.01);

(Continued)

(58) Field of Classification Search
CPC ....... B29C 70/44; B29C 51/28; B23K 20/023; B32B 37/0046; B32B 37/1009; B32B 37/10

See application file for complete search history.

(56) References Cited

U.S. PATENT DOCUMENTS

| 4,421,589 A | 12/1983 | Armini et al. |
| 4,889,276 A | 12/1989 | Cadwell |
| 5,040,946 A | 8/1991 | Caoduro |

(Continued)

OTHER PUBLICATIONS

Restriction Requirement dated Nov. 26, 2010 in U.S. Appl. No. 12/029,179.

(Continued)

*Primary Examiner* — Christopher Schatz
(74) *Attorney, Agent, or Firm* — Snell & Wilmer, L.L.P.

(57) ABSTRACT

A tool and method for bonding layers of a shell by the differential pressure bonding process. The tool and method includes a plurality of separable mandrel segments that combine to form a mandrel having a longitudinal axis, an outer surface, an upper end, and at least one substantially continuous inner surface. The inner surface has a substantially axisymmetric shape having complex curvature. In this embodiment, the tool further includes a retort configured to at least partially shroud the outer surface and upper end of the hollow body. The retort includes at least one vacuum port. The tool is configured to facilitate the compression of a plurality of layers of a multi-layer shell having complex curvature as the shell layers and an interdisposed bonding material are heated to an elevated bonding temperature.

13 Claims, 11 Drawing Sheets

(52) U.S. Cl.
CPC ......... *B23K 2203/16* (2013.01); *Y10T 156/10* (2015.01); *Y10T 156/1043* (2015.01)

(56) References Cited

U.S. PATENT DOCUMENTS

| | | | |
|---|---|---|---|
| 5,097,689 A | 3/1992 | Pietrobon | |
| 5,199,631 A | 4/1993 | Anderson et al. | |
| 5,214,948 A | 6/1993 | Sanders | |
| 5,592,288 A | 1/1997 | Sampica et al. | |
| 6,113,718 A | 9/2000 | Yamada et al. | |
| 7,049,548 B1 | 5/2006 | Sjogren et al. | |
| 8,679,284 B2 * | 3/2014 | Tada | B29C 63/025 156/285 |

OTHER PUBLICATIONS

Office Action dated Jan. 19, 2011 in U.S. Appl. No. 12/029,179.
Restriction Requirement dated Jul. 14, 2011 in U.S. Appl. No. 12/029,179.
Final Office Action dated Oct. 20, 2011 in U.S. Appl. No. 12/029,179.
Office Action dated Jun. 27, 2012 in U.S. Appl. No. 12/029,179.
Final office Action dated Dec. 3, 2012 in U.S. Appl. No. 12/029,179.
Advisory Action dated Mar. 7, 2013 in U.S. Appl. No. 12/029,179.
Office Action dated Apr. 16, 2013 in U.S. Appl. No. 12/029,179.
Notice of Allowance dated Jul. 18, 2013 in U.S. Appl. No. 12/029,179.
European Search Report dated Jun. 2, 2009 in European Application No. 09001841.7.
Communication Pursuant to Article 94(3) EPC dated Sep. 17, 2009 in European Application No. 09001841.7.
Communication Pursuant to Article 94(3) EPC dated Jun. 23, 2010 in European Application No. 09001841.7.
Communication Pursuant to Article 71(3) EPC dated Feb. 1, 2012in European Application No. 09001841.7.

* cited by examiner

TOOL AND METHOD FOR BONDING LAYERS OF A METALLIC AXISYMMETRIC STRUCTURE HAVING COMPLEX CURVATURES

CROSS REFERENCE TO RELATED APPLICATION

This application claims priority to and the benefit of U.S. Ser. No 12/029,179, entitled "TOOL AND METHOD FOR BONDING LAYERS OF A METALLIC AXISYMMETRIC STRUCTURE HAVING COMPLEX CURVATURES," filed on Feb. 11, 2008, the entire disclosures of which is incorporated herein by reference in its entirety for all purposes.

FIELD

The invention generally relates to tools and equipment for bonding face sheets to a honeycomb core to form a composite structure. More particularly, the invention relates to a tool for use in bonding metallic face sheets to a metallic honeycomb core by the differential pressure bonding process to form a hollow axisymmetric shell structure having complex curvatures, and a method of using such a tool.

BACKGROUND

The differential pressure bonding process can be used to bond together layered metallic materials to produce high-temperature panels and shells for use in modern aircraft. Such panels and shells can include an open cell or "honeycomb" metallic core and metallic face sheets covering the opposed faces of the core. The differential pressure bonding process generally includes applying a pressure differential across an assembly of metallic layers to simultaneously compress and bond the materials together at an elevated temperature. A bonding material disposed between the metallic layers bonds the sheets together such as by liquid interface diffusion bonding or brazing. The metallic layers can include titanium or Inconel® face sheets, titanium or Inconel® honeycomb cores, and the like.

The differential pressure bonding process was developed to provide a method of compressing an assembly of layered materials together as the materials are heated to a bonding temperature. The term "differential pressure" refers to a difference in pressures across a plurality of layered materials that acts to press the layered materials against a forming surface as the materials are heated and bonded together. The forming surface can be a surface of a plate, a mandrel, a die, or other tool having a surface profile corresponding to a desired shape of the bonded structure. A method of bonding metallic panels by the differential pressure bonding process is described in U.S. Pat. No. 5,199,631, assigned to Rohr, Inc., for example.

To produce a metallic shell structure having a simple cylindrical or conical shape using the differential pressure bonding process, metallic components to be bonded such as a titanium or Inconel® honeycomb core and titanium or Inconel® face sheets) can be positioned within a one-piece mandrel having a cylindrical or conical inner surface that corresponds to a desired outer shape of the cylindrical or conical shell. A thin layer of a suitable bonding material is applied between the surfaces of the materials to be bonded. As the assembled layers of materials and bonding material are heated to the bonding material's bonding temperature, a pressure differential is applied across the layered materials such that the layers are forced against the contoured inner surface of the mandrel. When the layered materials and bonding material are heated to the bonding temperature, the bonding material melts and fuses the layered materials together. Because the layered materials have been forced against the contoured inner surface of the mandrel by the applied pressure differential during heating of the bonding material, the outer surface of the resultant shell has a shape corresponding to the mandrel's cylindrical or conical inner surface. Once the shell has cooled, the simple cylindrical or conical shape of the one-piece mandrel permits the bonded shell and mandrel to be separated by longitudinally separating the shell and the mandrel.

Though the differential pressure bonding process described above can be used to produce shell structures having relatively simple cylindrical, conical, or substantially conical shapes, producing high temperature axisymmetric shells having complex curvatures by such a process presents special challenges. As used herein, the term "complex curvature" means having concave and/or convex curvatures wherein at least one intermediate diameter of the shell is either larger or smaller than both diameters at the ends of the shell. As described above, after bonding layers of a cylindrical or conical shell, the shape of the mandrel and the shell permits the shell and mated mandrel to be separated by pulling the bonded shell and mandrel apart in a longitudinal direction. For shells having non-cylindrical and non-conical shapes and substantial convex and or concave curvatures, however, the bonded shell is entrapped within the mandrel such that the substantially rigid shell cannot physically be extracted from the mandrel in a single piece. One solution to this problem is to produce the shell in a plurality of generally conical or generally cylindrical sections using the process described above, and joining the formed sections together end.-to-end using connecting hardware and/or by welding to form a complete shell. Such a multi-section shell necessarily includes at least one girth seam around the shell's circumference.

High-temperature axisymmetric shells like those described above can be used to form portions of modern aircraft engines. For example, such a high-temperature metallic shell can form at least a portion of an engine's exhaust nozzle center plug. FIG. 1 shows one example of a typical engine exhaust nozzle center plug 10. The center plug 100 includes a centerbody shell 102 and a tail cone 104. The centerbody shell 102 is joined to the tail cone 14 along a circumferential girth seam 106. The centerbody shell 102 has an axisymmetric convex curvature with a maximum diameter corresponding to highlight 108 (indicated by a dashed line in FIG. 1). As discussed above, existing methods of bonding a metallic shell having such complex curvatures using the differential pressure bonding process dictate that the centerbody shell 102 must be constructed in at least two sections separated at a girth seam 103 corresponding to the shell's maximum diameter. Thus the centerbody 102 must be constructed of a forward shell portion 112A having a first generally conical shape, and an aft shell portion 112B having a second generally conical shape. The generally conical shapes of the forward and aft shell portions 112A, 112B permits the shell portions to be longitudinally separated from a one-piece mandrel having a corresponding substantially conical shape after bonding.

One goal in the design of some modern aircraft engines is to minimize the noise emitted by the engines, especially during approach and take-off conditions. Accordingly, modern aircraft engines can include noise-attenuating panels and noise-attenuating shells designed to at least partially dissipate noise generated by an engine's combustor and rapidly rotating fan and rotor blades. As shown in FIG. 2, an engines noise emissions can be at least partially reduced by providing an outer skin 129 of the center plug's centerbody shell 112 with perforations 120 that permit acoustic communication with underlying open cells 122 of the shell's honeycomb core 124. A non-perforated inner skin 127 covers the inside of the open-cell core 124. Such an arrangement is known to dissipate acoustic energy via Helmholtz resonance. The depths of the open cells 122 can be sized to dissipate acoustic energy having a targeted frequency or range of frequencies. In order to maximize a structure's noise-attenuating capability, the percentage of the structure's exterior surface area associated with a perforated outer skin 129 and underlying open cells 122 should be maximized in order to maximize the number of active resonant cavities.

As discussed above, existing methods of bonding high-temperature shells having complex curvatures using the differential pressure method dictate that such shells must be constructed in at least two sections, and joined together end-to-end along at least one circumferential girth seam. Conventional methods of joining separate shell sections along a girth seam can reduce the surface area of a shell that is available for acoustic treatment, because skin perforations and cell cavities proximate to the seam often are blocked by connecting hardware and/or by welds commonly used to join such shell sections. In addition connecting hardware used to join shell sections increases the number of parts, and adds to the overall weight of the structure. Accordingly, there is a need for a method of bonding metallic layers of an axisymmetric shell having complex curvatures by the pressure differential bonding process such that shell is produced in a single piece. By producing the shell in a single piece, perforation and cell blockages associated with girth seam connections can be eliminated, and the external surface area of the shell available for acoustic treatment is maximized. In addition, producing a shell in a single piece can reduce the number of parts and the total weight of the structure, and can reduce overall production time.

SUMMARY

In one embodiment, the invention includes a tool for use in bonding layers of a shell by the differential pressure bonding process. In this embodiment, the tool includes a plurality of separable mandrel segments that combine to form a mandrel having a longitudinal axis, an outer surface, an upper end, and at least one substantially continuous inner surface. The inner surface has a substantially axisymmetric shape having complex curvature. In this embodiment, the tool further includes a retort configured to at least partially shroud the outer surface and upper end of the hollow body. The retort includes at least one vacuum port.

The invention also includes a segmented mandrel for use in bonding a shell by the differential bonding process. In one embodiment, the mandrel includes a substantially axisymmetric lower mandrel segment having a top and a first contoured inner surface, and a substantially axisymmetric upper mandrel segment having a bottom and a second contoured inner surface. When the bottom of the upper mandrel segment is concentrically positioned on the top of the bottom mandrel segment, the first and second contoured inner surfaces combine to form a substantially continuous axisymmetric surface having a complex curvature.

The invention also includes a method of bonding a plurality of layered materials by differential pressure bonding to produce an axisymmetric shell having an exterior surface with at least one convex or concave curvature. In one embodiment, the method includes assembling a segmented mandrel comprising a plurality of separable mandrel segments. The assembled mandrel has at least one substantially continuous inner surface that substantially corresponds in shape to the exterior surface of the shell. In addition, the method includes assembling the layered materials about the inner surface of the assembled mandrel. The method further includes heating the assembled mandrel and the layered materials to an elevated bonding temperature while establishing a pressure differential that presses the layered component materials against the inner surface of the mandrel as the layered materials are bonded together.

DETAILED DESCRIPTION

Figure 3:
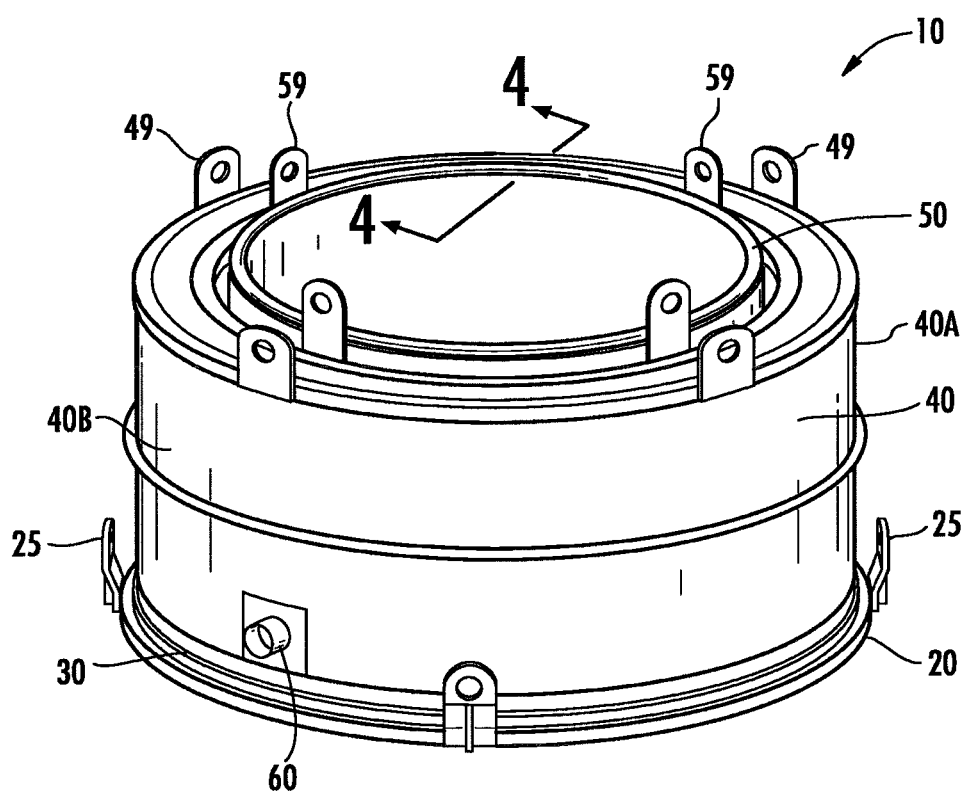
FIG. 3 is a perspective view of one embodiment of a bonding tool assembly fir use in bonding a high-temperature axisymmetric shell having convex curvatures using the differential pressure bonding process.

One embodiment of a bonding tool assembly 10 for use in bonding layered metallic materials together to produce an axisymmetric shell having convex curvatures using the differential pressure bonding process is shown in FIG. 3. In the shown embodiment, the tool assembly 10 includes a lifting ring 20, a base plate 30, a retort assembly 40, and a heat shield assembly 50. As shown in FIG. 3, the lifting ring 20 can include a plurality of spaced lifting lugs 25 to facilitate lifting and moving the tool assembly 10 using known lifting methods. The retort assembly 40 can be divided into upper and lower halves 40A, 40B to facilitate part loading and unloading. Optionally, the retort assembly 40 can include a plurality of lifting lugs 49. The heat shield assembly 50 also can include a plurality of spaced heat shield lifting lugs 59 for lifting, moving and placing the heat shield assembly 50.

Figure 4:
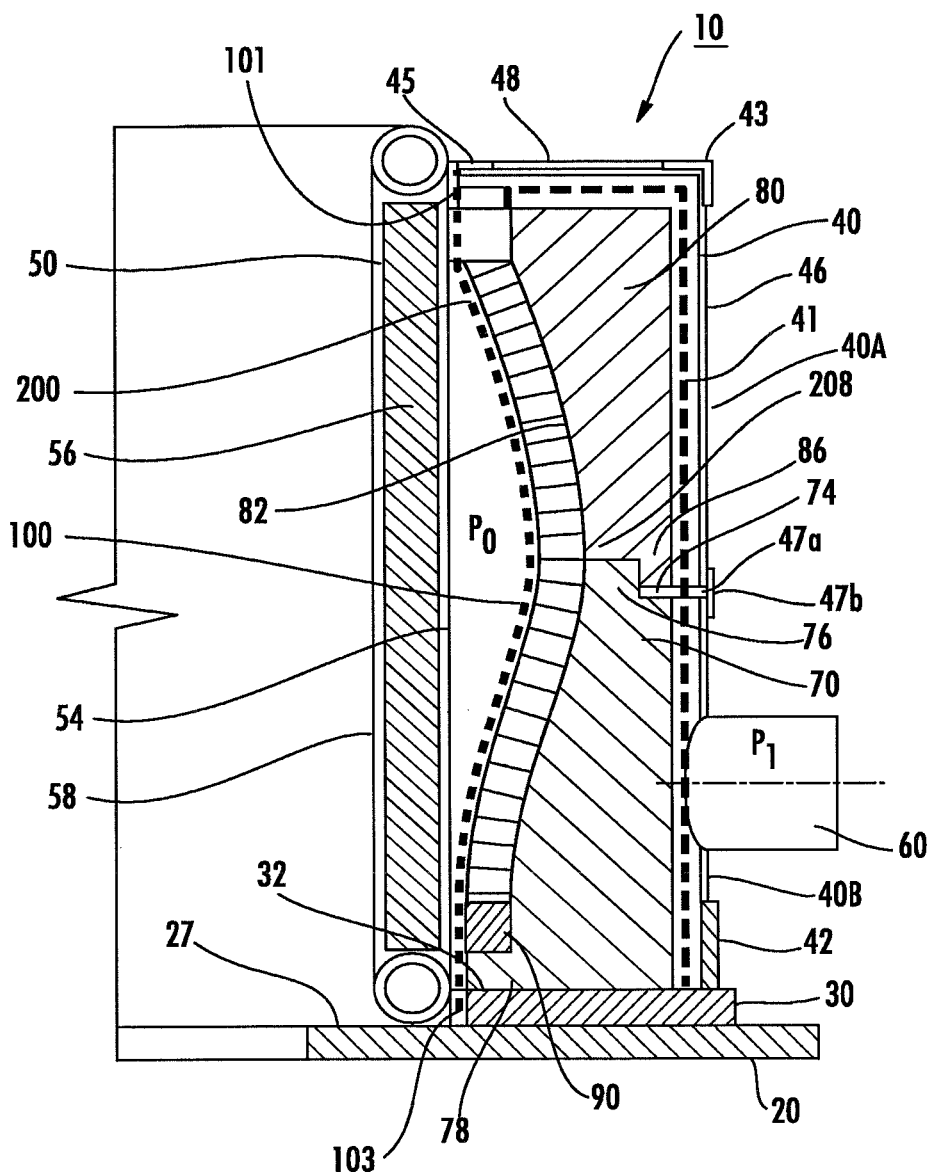
FIG. 4 is a partial cross-sectional elevation view of the bonding tool assembly shown in FIG. 3 taken along line 4-4 in FIG. 3, and showing axisymmetric shell having complex curvatures assembled within the tool assembly
Figure 6:
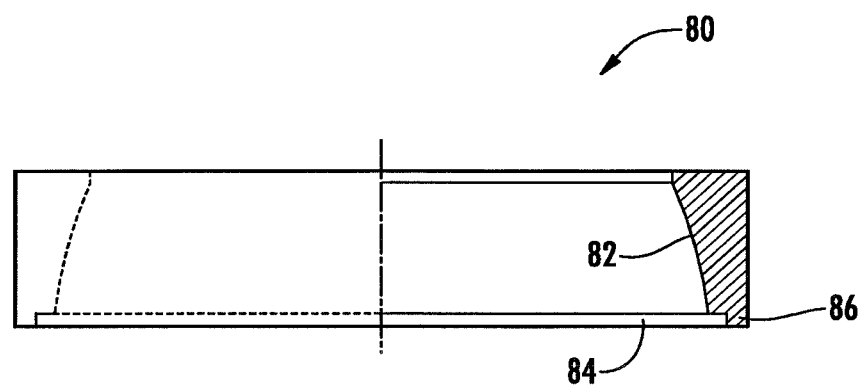
FIG. 6 is an elevation view of an upper mandrel segment portion of the tool assembly shown in FIGS. 3-5 shown in partial cross-section.
Figure 7:
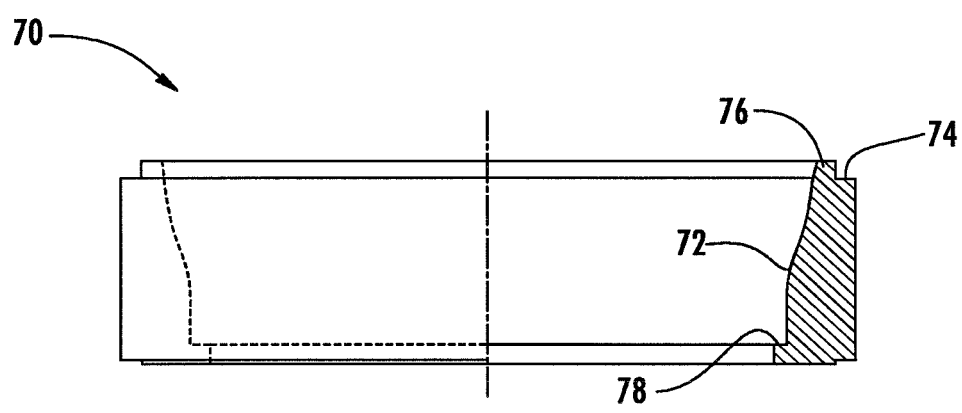
FIG. 7 is an elevation view of a lower mandrel segment portion of the tool assembly shown in FIGS. 3-5 shown in partial cross-section.

As shown in FIG. 4, the bonding tool assembly 10 further includes a lower mandrel segment 70, and an upper mandrel segment 80. In the embodiment of the lower mandrel segment 70 shown in FIGS. 4 and 7, the lower mandrel segment 70 includes at least one contoured inner surface 72, a lower ledge 78, an upper lip 76, and an upper step 74. The contoured inner surface 72 has a shape corresponding to a lower portion of a shell 200 to be bonded using the tool assembly 10. As shown in FIGS. 4 and 6, the upper mandrel segment 80 includes a contoured inner surface 82, a lower lip 86, and a counterbore 84. The contoured inner surface 82 has a shape corresponding to an upper portion of a shell 200 to be bonded using the tool assembly 10. As shown in FIG. 4, the upper mandrel segment 80 mates atop the lower mandrel segment 70 such that the lips 76 and 86 cooperate to concentrically align the mandrel segments 70, 80 with each other. As also shown in FIG. 4, the contoured inner surfaces 72, 82 of the aligned mandrel segments 70, 80 combine to define a substantially continuous axisymmetric contoured surface that defines a complete outer surface contour for a shell 200 to be bonded using the tool 10. At their innermost surfaces 72, 82, the lower and upper mandrel segments 70, 80 are separated by a seam that substantially coincides with a highlight 208 of the shell 200 along a circumference having a maximum diameter.

Figure 5:
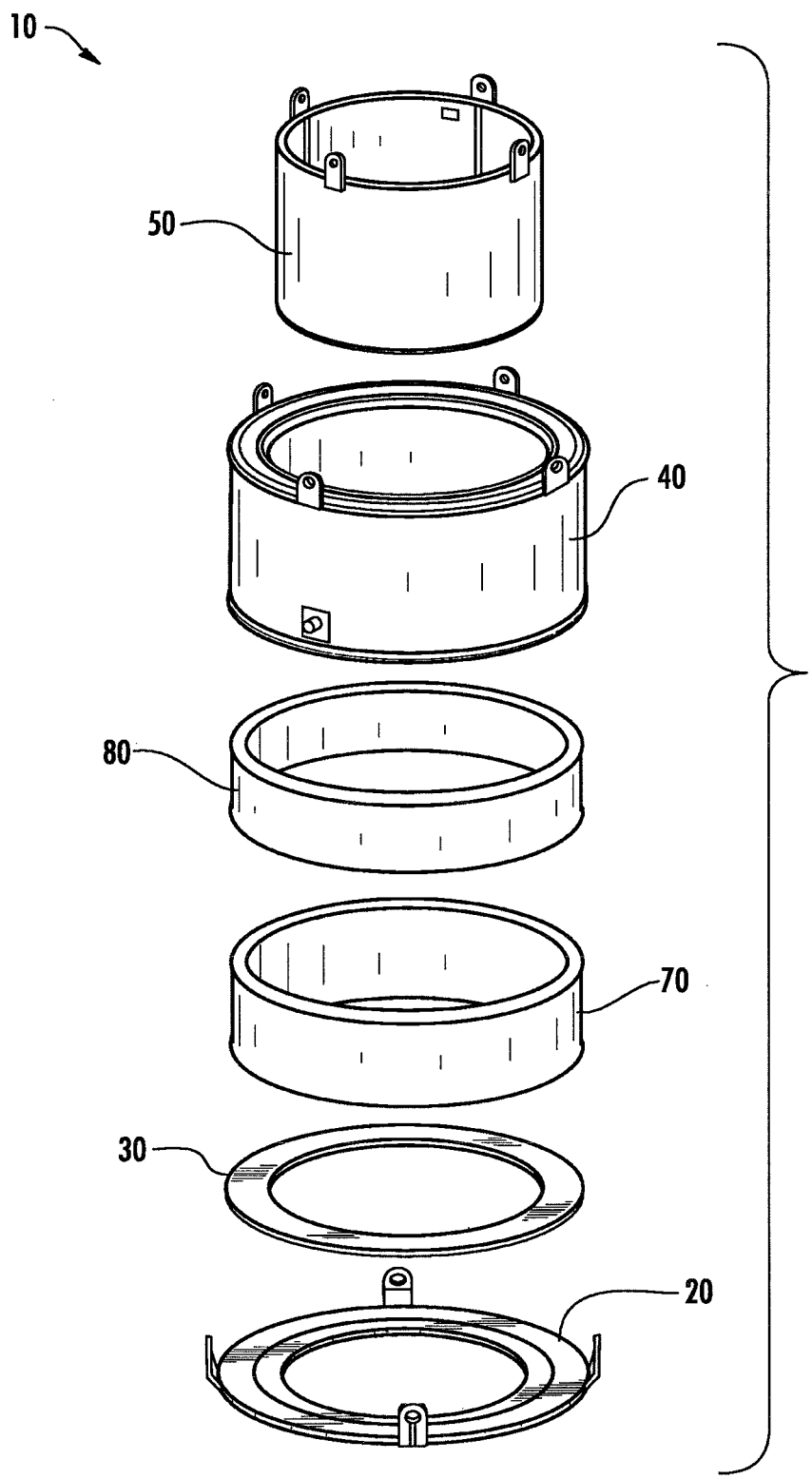
FIG. 5 is an exploded perspective view of the tool assembly shown in FIGS. 3 and 4.

In the embodiment shown in FIG. 4, the lower mandrel segment 70 sits atop the flat upper surface 32 of the base plate 30, and the base plate 30 sits atop the flat upper surface 27 of the lifting ring 20. As shown in FIG. 5, the lifting ring 20, base plate 30, lower mandrel 70 and upper mandrel 80 are substantially concentrically aligned with each other. As shown in FIG. 4, the cylindrical skin 46 of the retort assembly 40 surrounds the cylindrical outer surfaces of the assembled mandrel segments 70, 80, and the upper skin 48 of the retort assembly 40 overhangs and covers the top of the upper mandrel segment 80, thereby at least partially shrouding the mandrels 70, 80. An impermeable flexible membrane 100 is positioned over the inner surface of the shell 200. The flexible membrane 100 can he constructed of stainless steel, titanium or the like. An upper edge 101 of the flexible membrane 100 is sealed to an upper interior portion of the retort assembly 40, and a lower edge 103 of the flexible membrane 100 is sealed to the base plate 30.

As also shown in FIG. 4, the thermal shield assembly 50 is concentrically positioned inside the assembled mandrel segments 70, 80, and sits atop the flat upper surface 27 of the lifting ring 27. As shown in FIGS. 4 and 5, the thermal shield assembly 50, retort assembly 40, upper mandrel segment 80, and lower mandrel segment 70 are concentrically nested together atop the base plate 30 and lifting ring 20.

Figure 8:
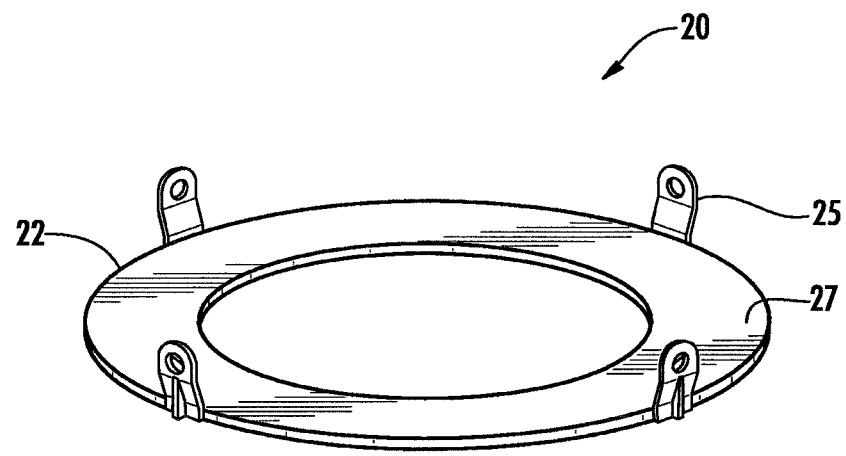
FIG. 8 is a perspective view of a lifting ring portion of the bonding tool assembly shown in FIGS. 3-5.

One embodiment of a lifting ring 20 for use with the tool assembly 10 is shown in FIG. 8. In this embodiment, the lifting ring 20 includes a disc 22 having an open center. The upper surface 27 of the disc 22 is substantially flat. A plurality of spaced lifting lugs 25 can be attached to the disc 22 along its periphery.

Figure 9A:
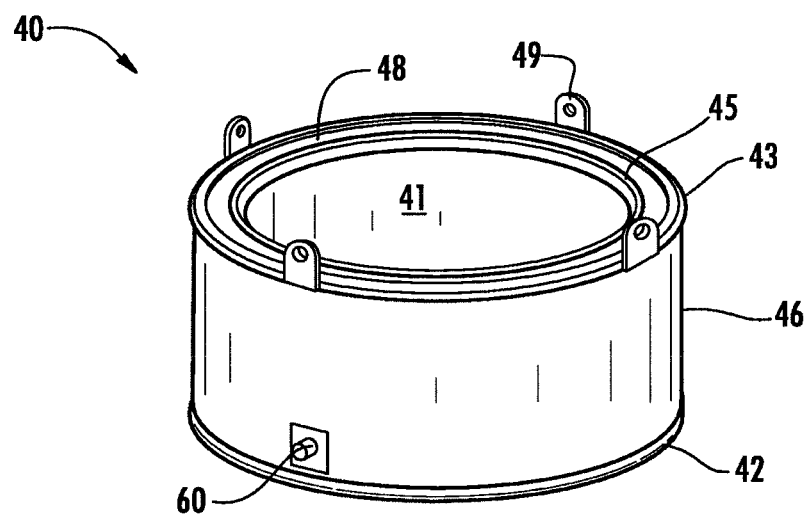
FIG. 9A is a perspective view of a retort portion of the bonding tool assembly shown in FIGS. 3-5.
Figure 9B:
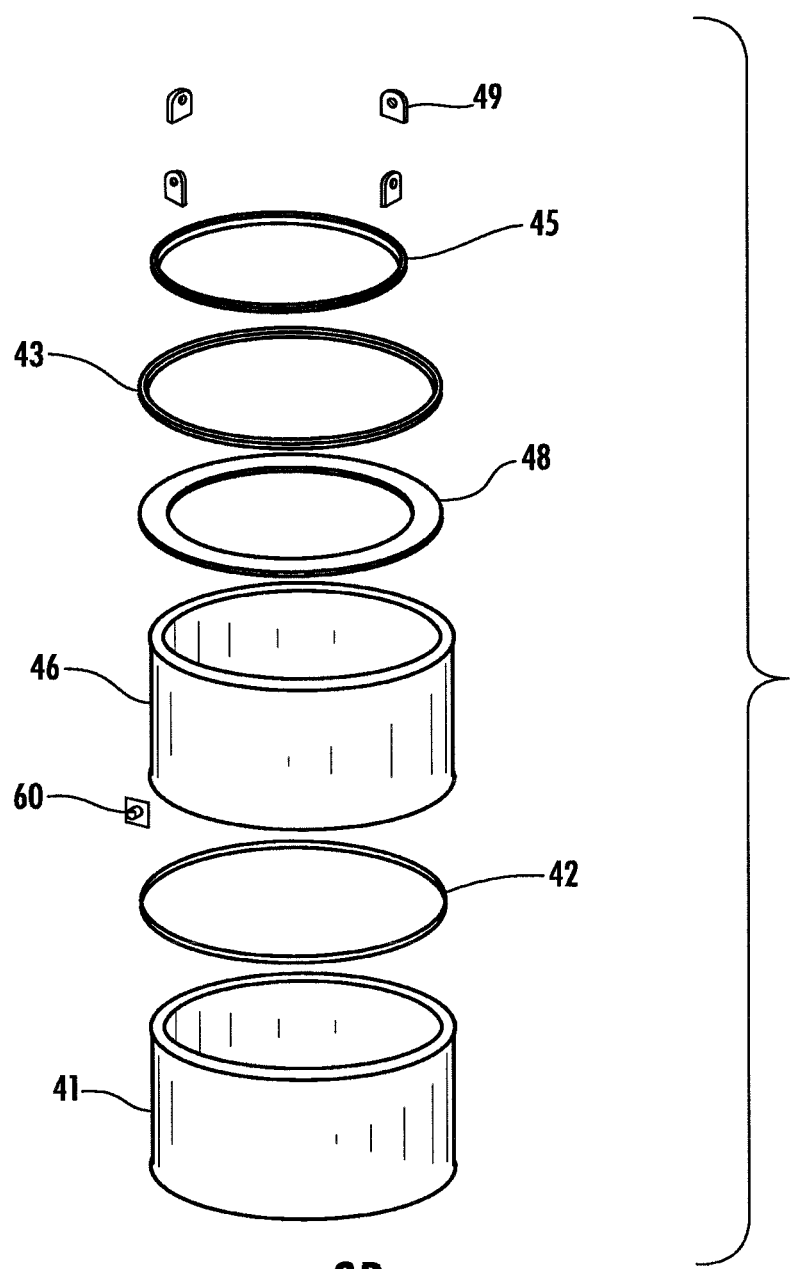
FIG. 9B is an exploded perspective view of the retort shown in FIG. 9A.

One embodiment of a retort 40 for use with the tool assembly 10 is shown in FIGS. 9A and 9B. In this embodiment, the retort assembly 40 includes an outer skin 46 and an upper skin 48. The outer and upper skins 46, 48 can be constructed of sheet metal, such as type 321 stainless steel having a nominal thickness of about 0.06 inch, or the like. Other materials also can be used to construct the skins 46, 48. The lowermost edge of the thin outer skin 46 can be reinforced by a stiffener ring 42. The uppermost edge of the outer skin 46 can be connected to the outer edge of the upper skin 48 by an outer angle 43, and the inside edge of the upper skin 48 can be reinforced by an inner angle 45. The stiffener ring 42 and outer and inner angles 43, 45 also can be constructed of type 321 stainless steel, and are welded to the skins 46, 48 by continuous gas-tight seal welds all around. As shown in FIG. 4, the inside of the outer skin 46 and at least a portion of the undersurface of the upper skin 48 are lined with wire mesh 41. The wire mesh 41 can be constructed of 304 stainless steel wire having a diameter of about 0.063 inch, and can have about seventy-five percent open area. The wire mesh 41 can be tack welded to the inside surfaces of the outer skin 46 and the upper skin 48 to secure the wire mesh 41 in place. As shown in FIG. 9A, a plurality of spaced lifting lugs 49 can be welded to the outer angle 43 for use in lifting and placing the retort 40. As shown in FIGS. 9A-9B and 4, at least one vacuum port 60 is provided on the outer skin 46.

If desired, the retort 40 described above can be constructed in upper and lower halves 40A, 40B. As shown in FIG. 4, the retort 40 can be split along a circumferential seam 47a that substantially aligns with the vertical separation between the upper and lower mandrel segments 70, 80. As also shown in FIG. 4, the outer skin 46 can be joined and sealed along the seam 47a by a membrane 47b that is welded or otherwise joined to the inner or outer diameter of the outer skin 46. The membrane 47b can be constructed of a flexible stainless steel material, or the like.

Figure 10A:
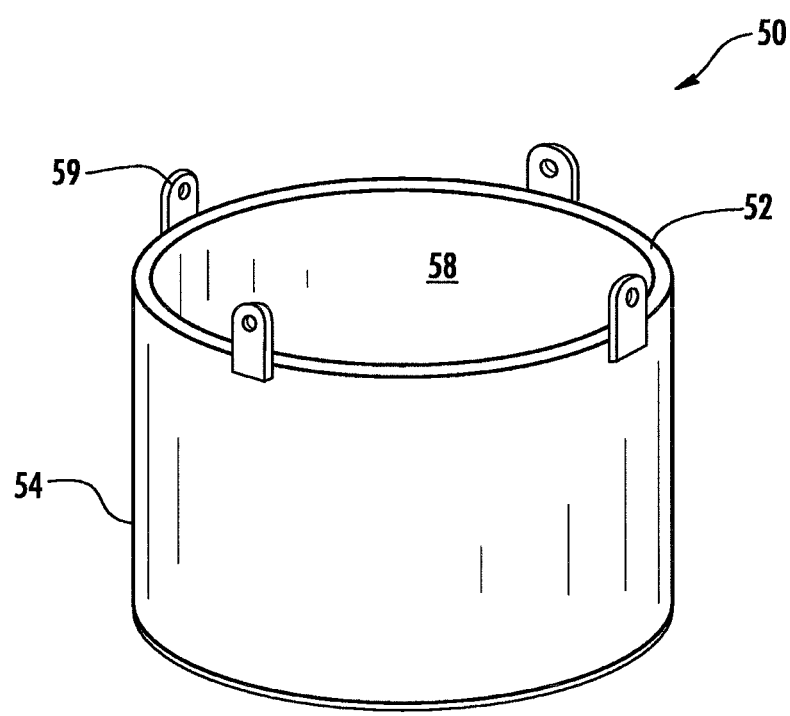
FIG. 10A is a perspective view of a heat shield assembly portion of the bonding tool assembly shown in FIGS. 3-5.
Figure 10B:
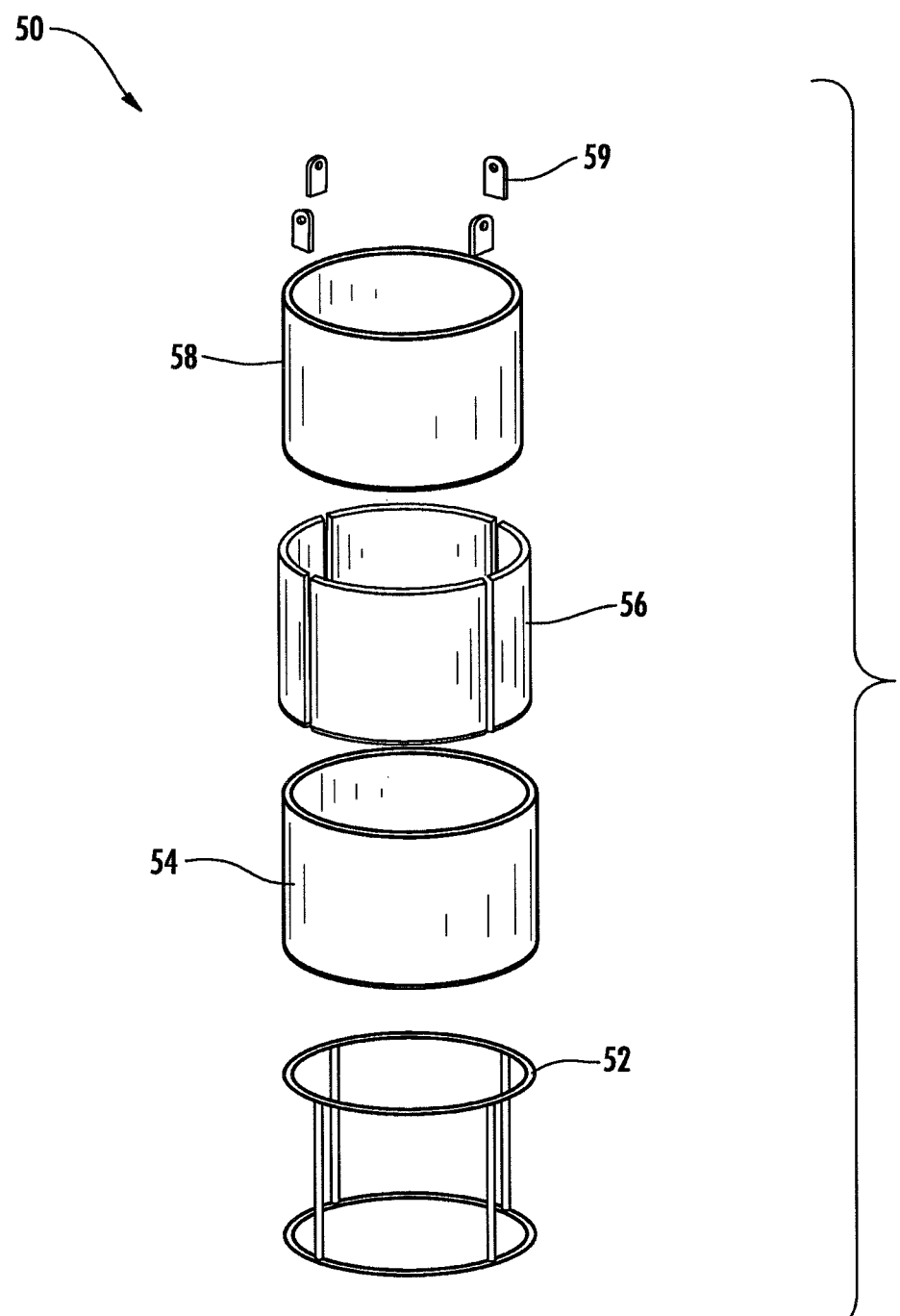
FIG. 10B is an exploded perspective view of the heat shield assembly shown in FIG. 10A.

One embodiment of a thermal shield 50 for use in the tool assembly 10 is shown in FIGS. 10A and 10B. In this embodiment, the thermal shield includes a frame 52. The frame 52 can be constructed of welded 304 stainless steel pipe having a nominal diameter of about 0.75 inch. An outer skin 54 surrounds the frame 52, and a concentric inner skin 58 lines the interior of the frame. The outer and inner skins 54, 58 can be constructed of 321 stainless steel having a nominal thickness of about 0.06 inch. As shown in FIG. 4, thermal insulation 56 is disposed in the annular region between the inner and outer skins 54, 58. The insulation 56 can include one or more layers of Saffil® high-temperature insulation, or the like.

Figure 1:
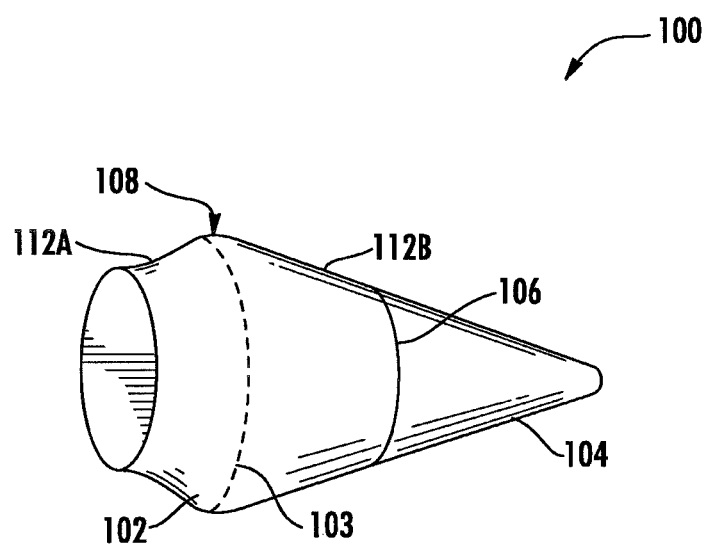
FIG. 1 is a perspective view of typical exhaust nozzle center plug for a modern aircraft engine.
Figure 2:
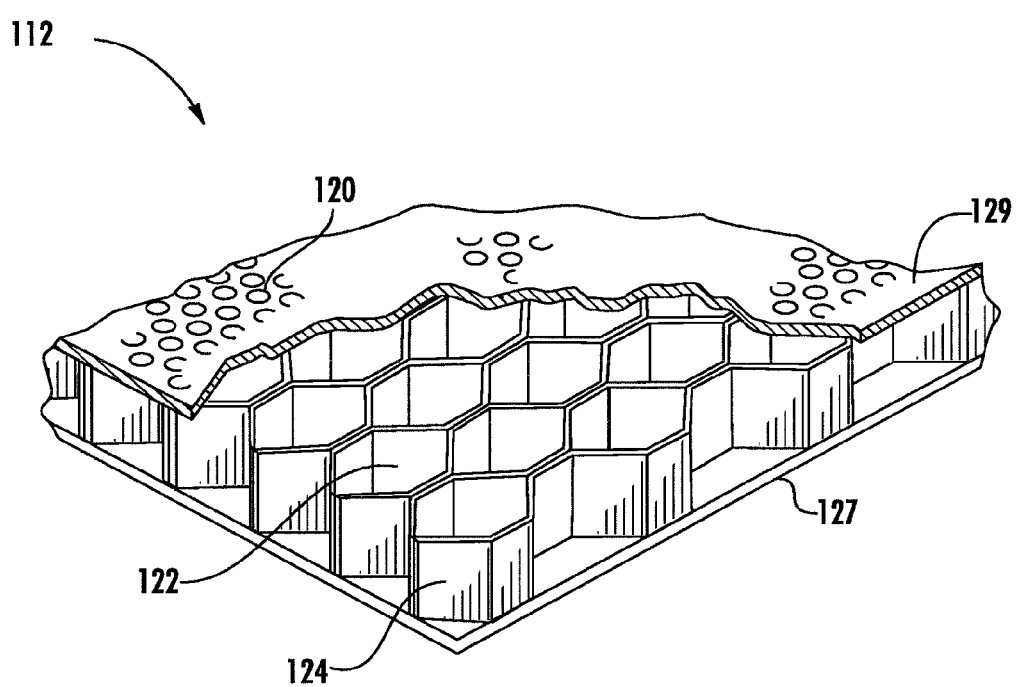
FIG. 2 is a perspective view of a cutaway portion of typical single-degree-of-freedom noise-attenuating panel or shell of a modern aircraft engine structure.
Figure 11:
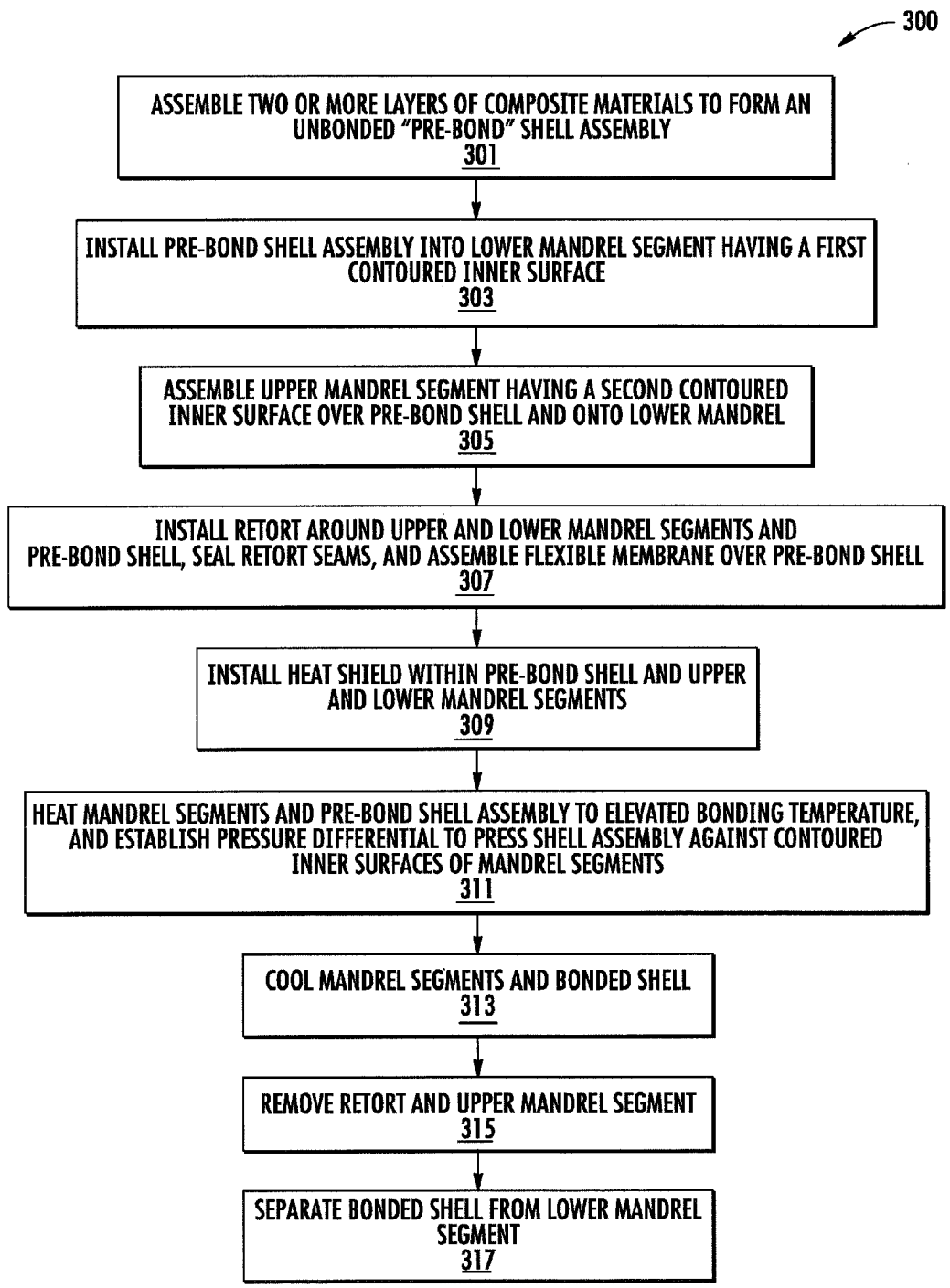
FIG. 11 is a flow chart showing a method of bonding components of an axisymmetric shell having complex curvatures by the differential pressure bonding process.

One embodiment of a method 300 of using a bonding tool assembly 10 like that described above to bond an axisymmetric metallic shell having complex curvatures by the differential pressure bonding process is summarized in FIG. 11. In step 301, two or more metallic layers are assembled together to form a "pre-bond" shell assembly 200. For example, the unbonded shell assembly 200 can include an outer skin 129, an open-cell core 124, and an inner skin 127 like that shown in FIG. 2. The skins 127, 129 and core 124 can be titanium, Inconel®, or any other material or materials capable of being bonded using the pressure differential bonding method. The surfaces of the inner and outer skins 127, 129 in contact with the honeycomb core 124 are coated with a thin layer of a bonding material of a type known in the art. As shown in FIG. 4, a lower edge of the shell 200 can be vertically supported by a plurality of spaced riser blocks 90 positioned atop the lower ledge 78 of the lower mandrel 70. The riser blocks 90 can be constructed of graphite, or the like, and can have a simple rectilinear shape. The shape of the pre-bond shell assembly 200 substantially conforms to the shape of the inner surfaces 72, 82 of the upper and lower mandrel segments 70, 80.

In step 303, the lower portion of the pre-bond shell assembly 200 is installed into a lower mandrel segment 70 having a first axisymmetric contoured inner surface 72. In step 305, an upper mandrel segment 80 having a second axisymmetric contoured inner surface 82 is installed over an upper portion of the pre-bond shell assembly 200 and onto the lower mandrel assembly 70. As shown in FIG. 4, when the upper and lower mandrel segments 70, 80 are assembled together, they define a substantially continuous axisymmetric contoured inner surface 72, 82.

In step 307 (and as shown in FIG. 4), a retort assembly 40 is placed around the mandrel segments 70, 80 and the unbonded shell 200 such that the retort shrouds the outside surfaces of the mandrels. A gas tight seal between the lower edge of the retort 40 (e.g. stiffener ring 42) and the base plate 30 can be established by welding, a flexible membrane across the gap between the parts. All other seams of the retort 40 are sealed, preferably by welding. As shown in FIG. 4, a flexible membrane 100 is placed over the inner diameter of the unbonded shell 200, and sealed along its top edge 101 to the retort 40, and sealed along its lower edge 103 to the base plate 30.

In step 309 (and as shown in FIG. 4), a thermal shield assembly 50 can be positioned inside the hollow mandrel segments 70, 80 and the shell 200. The thermal shield 50 assembly can be used to shield the shell and moderate the heating rate of the shell 200, thus substantially preventing unwanted thermally-induced deformations of the thin metallic layers of the shell during heating and bonding.

In step 311, the upper and lower mandrel segments 80, 70 and the unbonded shell 200 are heated to the bonding temperature of the bonding material. As the shell 200 is heated, a pressure gradient is established across the mandrel segments 70, 80 (as described below) such that the layered materials of the unbonded shell 200 are pressed against the contoured inner surfaces 72, 82 of the mandrel segments 70, 80. Accordingly, the outer surface of the shell 200 is forced to conform to the shape of the contoured surfaces 72, 82 as the shell 200 is heated.

Referring to FIG. 4, the required pressure gradient across the mandrel segments 70, 80 can be achieved as follows. First, a retort assembly 40 is placed around the mandrel segments 70, 80 and the unbonded shell 200 such that the retort shrouds the outside surfaces of the mandrels. A flexible membrane can be welded between the lower end of the retort 40 and the base plate 30 to form a gas tight seal therebetween. The tool assembly 10 and unbonded shell 200 is placed within a vacuum furnace, and the internal pressure of the furnace is lowered to a pressure $P_0$ as the furnace is heated. Also as the furnace is heated, a vacuum is separately applied to the vacuum port 60 on the retort assembly 40 such that the pressure in the vacuum port 60 and in the outermost interior regions of the retort 40 surrounding the outer circumferences of the mandrel segments 70, 80 is at or about a pressure $P_1$. Pressure $P_1$ should be at least slightly lower than the internal pressure $P_0$ such that the pressure differential ($P_0-P_1$) acts radially outward on the flexible membrane 100 and shell 200. For example, $P_1$ can be about one psi (pound per square inch) less than pressure $P_0$. Both $P_1$ and. $P_0$ can be near about $10^{-3}$ torr to about $10^{-5}$ torr or higher. The resulting pressure differential ($\Delta P = (P_0-P_1) > 0$ psi) forces the flexible membrane 100 against the inner diameter of the unbonded shell 200, and forces the layered materials of the unbonded shell 200 against the contoured inner surfaces 72, 82 of the mandrel segments 70, 80. Accordingly, as the shell 200 and brazing material is heated, the outer surface of the shell 200 is forced to conform to the contoured shape of the inner surfaces 72, 82 of the mandrels 70, 80, and the shell materials are compressed together.

Returning to FIG. 11, the shell 200 and tool assembly 10 are heated 311 until the brazing material melts and diffuses between the compressed component materials of the shell 200. For example, the furnace may be heated to between about 1600 degrees F. and about 2000 degrees F. for about 1 to 6 hours, depending on the bonding characteristics of the shell and bonding materials. Once the bonding material has melted, the upper and lower mandrel segments 80, 70 and the shell 200 are cooled 313 to about room temperature, thereby causing the bonding material to solidify and to bond the shell components together. Once the shell 200 and mandrel segments have cooled, the upper mandrel 80 and retort 40 can be separated 315 from the shell 200 and from the lower mandrel segment 70. For the bonding tool assembly 10 shown in FIG. 4, the retort assembly 40 must be removed before the upper mandrel segment 80 is separated from the shell 200 and from the lower mandrel segment 70. In addition, the thermal shield 50 should be removed before removing the upper mandrel segment 80 in order to improve access to the upper mandrel segment 80. As can be seen by examining FIG. 4, once the flexible membrane 100, retort 40 and upper mandrel segment 80 are removed, the bonded shell 200 can be longitudinally separated 317 from the lower mandrel segment 70 without obstruction.

The embodiments of the invention described above are intended to illustrate various aspects and features of the invention, and are not intended to limit the invention thereto. Persons of ordinary skill in the art will recognize that various changes and modifications can be made to the described embodiments without departing from the invention. For example, though the tool assembly 10 has been described as including two mandrel segments 70, 80, a tool assembly according to the invention may include more than two separable mandrel segments. In addition, though the mandrel segments have specifically been described as being separated along a joint that is transverse to their longitudinal axes, the mandrel segments could be separable along two or more longitudinal joints. These and all such obvious variations are intended to be within the scope of the appended claims.

What is claimed is:

1. A tool for use in bonding layers of a shell by a differential pressure bonding process, the tool comprising:
   a plurality of separable mandrel segments that combine to form a mandrel having a longitudinal axis, an outer surface, an upper end, and at least one substantially continuous inner surface, the inner surface having a substantially axisymmetric shape;
   a retort configured to at least partially shroud the outer surface and upper end of the mandrel, the retort including at least one vacuum port; and
   an impermeable flexible membrane positioned over the inner surface of the mandrel, the membrane and mandrel constructed to receive therebetween layers of a shell to be bonded together; wherein:
   the retort, the mandrel and the impermeable flexible membrane are arranged such that: application of a vacuum to the vacuum port of the retort during a differential pressure bonding process forces the impermeable flexible membrane in a radially outward direction of the tool and towards the inner surface of the mandrel, thereby forcing the flexible membrane against the layers of the shell to be bonded together, wherein the flexible membrane is removed from the inner surface of the mandrel and the flexible membrane is flexible when removed from the mandrel.

2. A tool according to claim 1 wherein the plurality of mandrel segments comprises an upper mandrel segment and a lower mandrel segment.

3. A tool according to claim 1 wherein the substantially axisymmetric shape of the mandrel includes a circumferential highlight, and wherein at least two of the mandrel segments mate proximate to the highlight.

4. A tool according to claim 1 and further comprising a base plate on which the mandrel segments can be assembled.

5. A tool according to claim 1 and further comprising a thermal shield positioned within the mandrel.

6. A tool according to claim 1 and further comprising a lifting ring for simultaneously lifting the mandrel and the retort.

7. A tool according to claim 1 wherein the plurality of mandrel segments includes a bottom mandrel segment having an inner ledge, and further comprising a plurality of riser blocks on the ledge for supporting the shell during differential pressure bonding.

8. A tool according to claim 1 wherein the retort includes an outer skin, an inner skin, and a wire mesh within the inner skin.

9. A tool according to claim 1 wherein the retort includes upper and lower separable portions.

10. A segmented mandrel for use in bonding a shell by the differential bonding process, the mandrel comprising:
a substantially axisymmetric lower mandrel segment having a top and a first contoured inner surface;
a substantially axisymmetric upper mandrel segment having a bottom and a second contoured inner surface;
wherein when the bottom of the upper mandrel segment is concentrically positioned on the top of the bottom mandrel segment, the first and second contoured inner surfaces combine to form a substantially continuous axisymmetric surface having a complex curvature,
wherein the mandrel is configured to receive an impermeable flexible membrane positioned over the first and second contoured inner surfaces, the membrane and mandrel constructed to receive therebetween layers of a shell to be bonded together,
wherein the mandrel and the impermeable flexible membrane are arranged such that: application of a vacuum during a differential pressure bonding process forces the impermeable flexible membrane in a radially outward direction of the segmented mandrel and towards the first and second contoured inner surfaces, thereby forcing the flexible membrane against the layers of the shell to be bonded together, wherein the flexible membrane is removed from the first and second contoured inner surfaces and the flexible membrane is flexible when removed from the segmented mandrel.

11. A segmented mandrel according to claim 10 wherein the top of the lower mandrel segment includes a first alignment element, the bottom of the upper mandrel segment includes a second alignment element, and wherein the first and second alignment elements cooperate to concentrically align the mandrel segments when the bottom of the upper mandrel segment is positioned on the top of the bottom mandrel segment.

12. A segmented mandrel according to claim 10, wherein at least a portion of the substantially continuous axisymmetric surface has a substantially concave shape.

13. A segmented mandrel according to claim 10, wherein at least a portion of the substantially continuous axisymmetric surface has a substantially convex shape.

* * * * *